Patented Oct. 10, 1922.

1,431,656

UNITED STATES PATENT OFFICE.

WILHELM HERZBERG, OF BERLIN-WILMERSDORF, AND GERHARD HOPPE, OF BERLIN-TREPTOW, GERMANY, ASSIGNORS TO ACTIEN GESELLSCHAFT FUR ANILIN FABRIKATION, OF BERLIN, GERMANY.

DYE.

No Drawing.   Application filed August 30, 1921. Serial No. 496,972.

*To all whom it may concern:*

Be it known that we, WILHELM HERZBERG and GERHARD HOPPE, citizens of the German Republic, residing at Prinzregentenstr. 10, Berlin-Wilmersdorf, Germany, and Retheistr. 2, Berlin-Treptow, Germany, have invented certain new and useful Improvements in Dyes, (for which we have filed an application in Germany November 25, 1920), of which the following is a specification.

Our present invention relates to new dyes applicable as pigments and for dyeing fibrous material in the vat.

These dyes form yellow to orange crystals scarcely soluble in organic solvents but soluble in concentrated sulfuric acid with an orange red color. Reduced by sodium hydrosulfite in the presence of sodium hydroxide they yield a vat from which vegetable and animal fibrous material is dyed yellow to orange tints fast to the action of chlorine and soap. The new dyes are derivatives of azines and contain in their molecule the residue of naphthsultam.

These new dyes may be manufactured by condensing naphthsultam-3.4-phenazin (Zincke, Annalen der Chemie 412, 106) with a quinone derivative substituted by halogen, such as tetrachlorobenzoquinone, 2-chloro-1.4-naphthoquinone, 2:3-dichloro-1.4-naphthoquinone, chloronaphthsultamquinone (Zincke, Annalen der Chemie 412, 95) 2.3-dichloro-1-naphthsultamquinone (Zincke, Annalen der Chemie 412, 97).

The manufacture of the dyes may be illustrated by the following examples without limiting the invention, the parts being by weight:

1. 3 parts of naphthsultam-3.4-phenazine, 2.6 parts of chloranil, 2 parts of sodium acetate and 80 parts of nitrobenzene are heated for an hour at 100° C. A red solution is formed from which the condensation product settles as yellow crystals being filtered off when cool. The condensation product by sodium hydrosulfite in the presence of caustic soda lye is converted into an olive brown vat from which cotton is dyed yellowish.

2. 6 parts naphthsultam-3.4-phenazine, 2.6 parts of chloranil, 4 parts of sodiumacetate and 200 parts of nitrobenzene whilst stirring are heated during 2 hours at 120 to 140° C. After cooling the crystals of the dye are filtered off. The orange crystals are dissolved by concentrated sulfuric acid with an orange red color. From the olive-brown vat cotton is dyed brown yellow turning to orange on treating with chlorine.

3. 3 parts of naphthsultam-3.4-phenazine, 2.3 parts of 2.3-dichloro-1.4-naphthoquinone, 2 parts of anhydrous sodium acetate and 80 parts of nitrobenzene are heated during 2 hours at 140 to 150° C. The dye separated in the form of brownish yellow needles gives an orange-red solution in concentrated sulfuric acid and dyes cotton and wool clear greenish yellow shades.

4. 3 parts of naphthsultam-3.4-phenazine, 2 parts of 2.3-dichloro-4-naphthsultamquinone, 2 parts of sodium acetate and 60 parts of nitrobenzene are heated for an hour at 100° C. The dye settles in orange crystals soluble in concentrated sulfuric acid with an orange red color and dyeing from its olive vat yellow tints.

Having now described our invention and the manner in which it may be performed what we claim is,—

1. The herein described new dyes being condensation products of naphthsultam-3.4-phenazine with a quinone-derivative substituted by halogene, being yellow to orange crystals or powders scarcely soluble in organic solvents, but soluble in concentrated sulfuric acid with an orange-red color and being reduced by sodium hydrosulfite in the presence of sodium hydroxide yielding a vat from which fibrous material is dyed yellow to orange tints, fast to the action of chlorine and soap.

2. The herein described new dyes being condensation products of naphthsultam-3.4-phenazine with a 1.4-naphthoquinone derivative substituted by halogene in the quinone nuclea, being yellow to orange crystals, or powders scarcely soluble in organic solvents, but soluble in concentrated sulfuric acid with an orange-red color and being reduced by sodium hydrosulfite in the presence of sodium hydroxide yielding a vat from which fibrous material is dyed yellow tints, fast to the action of chlorine and soap.

3. The herein-described new dyes being condensation products of naphthsultam-3.4-phenazine with a 1.4-naphthoquinone derivative substituted by halogene in the 2- and 3-position, being yellow to orange crystals or powders, scarcely soluble in organic solvents, but soluble in concentrated sulfuric acid with an orange-red color and being reduced by sodium hydrosulfite in the presence of sodium hydroxide yielding a vat from which fibrous material is dyed yellow tints, fast to the action of chlorine and soap.

4. The herein described new dye being the condensation product of naphthsultam-3.4-phenazine with 2.3-dichloro-1.4-naphthoquinone, being a yellow powder or yellow crystals, scarcely soluble in organic solvents, but soluble in concentrated sulfuric acid with an orange red color and being reduced by sodium hydrosulfite in the presence of sodium hydoxide yielding a vat from which fibrous material is dyed yellow tints fast to the action of chlorine and soap.

In testimony whereof we affix our signatures in presence of two witnesses.

WILHELM HERZBERG.
GERHARD HOPPE.

Witnesses:
OSWALD SCHARFENBERG.
RUDOLF HAUGWITZ.